United States Patent [19]

Agouri et al.

[11] 3,949,016

[45] Apr. 6, 1976

[54] METHOD FOR COPOLYMERIZING MONOMERS OF DIFFERENT TYPES AND POLYMER BLENDS CONTAIN THE COPOLYMER

[75] Inventors: Elias Agouri; Philippe Mornet, both of Pau; Claude Parlant, Arthez-de-Bearn; Jacques Rideau, Pau, all of France

[73] Assignee: Societe Nationale des Petroles d'Aquitaine, Courbevoie, France

[22] Filed: Aug. 22, 1974

[21] Appl. No.: 499,537

Related U.S. Application Data

[60] Division of Ser. No. 342,193, March 16, 1973, Pat. No. 3,851,015, which is a continuation-in-part of Ser. No. 227,265, Feb. 17, 1972, abandoned, which is a continuation-in-part of Ser. No. 851,977, Aug. 18, 1969, abandoned.

[52] U.S. Cl. ...... 260/876 B; 260/897 B; 260/878 B; 260/DIG. 32
[51] Int. Cl.$^2$ .......................................... C08L 23/06
[58] Field of Search .......... 260/897, 876 B, DIG. 32

[56] References Cited
UNITED STATES PATENTS

| | | | |
|---|---|---|---|
| 3,079,312 | 2/1963 | Alsys.................................. | 204/154 |
| 3,228,790 | 1/1966 | Sexsmith et al.................. | 260/897 X |
| 3,299,181 | 1/1967 | Coover et al. ..................... | 260/897 |
| 3,299,185 | 1/1967 | Kyoto et al. ......................... | 260/897 |
| 3,364,281 | 1/1968 | Saito et al........................... | 260/873 |

FOREIGN PATENTS OR APPLICATIONS

870,650   6/1961   United Kingdom............. 260/876 R

*Primary Examiner*—Carman J. Seccuro
*Attorney, Agent, or Firm*—Norman S. Blodgett; Gerry A. Blodgett

[57] ABSTRACT

The present invention describes a process of producing block copolymers from monomers of different types by polymerization in two successive steps. The first step consists in polymerizing monomers of a first type by means of coordinated anionic catalysts comprising organo-metallic compounds of a metal of the Group IA, IIA, IIIA, or mixtures thereof of Mendeleev's Periodic Table of Elements, associated with a transition metal compound of Group IV to VIII and the second step comprises polymerizing a second type of monomer in the presence of the polymer formed in the first step and in the presence of free radical catalysts, wherein 0.01 to 100 moles of an adjuvant per mole of transition metal compound is added to the reaction medium of the first step and this adjuvant consists of a compound $MY_n$ in which M is selected from the group consisting of boron and Group IIB metals of Mendeleev's Periodic Classification of the Elements, n is the valency of M, and Y represents a member selected from the group consisting of a monovalent hydrocarbyl group, hydrogen and a halogen atom. The block copolymers thus formed can be used in preparing blends with other polymers.

3 Claims, No Drawings

METHOD FOR COPOLYMERIZING MONOMERS OF DIFFERENT TYPES AND POLYMER BLENDS CONTAIN THE COPOLYMER

CROSS-REFERENCE TO RELATED APPLICATIONS

This is a division, of application Ser. No. 342,193 filed Mar. 16, 1973, now U.S. Pat. No. 3,851,015, which was a continuation-in-part of application Ser. No. 227,265 filed Feb. 17, 1972, which was a continuation of application Ser. No. 851,977 filed Aug. 18, 1969 both now abandoned.

BACKGROUND OF THE INVENTION

One recent process consists in, first of all, carrying out in known manner the polymerization of a monomer, especially, olefin or diolefin in the presence of an anionic catalyst system comprising an organometallic compound of a metal of the Groups I, II or III of the Periodic Table and a compound of a transition metal; thereafter, without deactivating this catalyst system, the polymer which is obtained has added thereto a monomer which can be subjected to radical polymerization, and a radical catalyst, especially oxygeen or peroxide, and the polymerization of this second type is allowed to be effected. Such operations are described in U.S. Pat. No. 3,277,210 for the particular case of ethylene and vinyl acetate, while as regards other monomers, the operations are described in French Pat. No. 1,531,409 and the report of J.L. JEZL, N.S. CHU and E.M. KHELGHATIAN, entitled: "Anionic free radical polymers of alphaolefins" and presented during a congress held at San Francisco from the March 31 to the April 5th 1968 (155th A.C.S. National Meeting — Industrial and Engineering Chemistry).

By applying the known procedure under normal conditions, it is found firstly that it is only possible to use a fairly reduced number of monomers which can be polymerized by radicals, and that even in this case, it is essential, for obtaining a tangible quantity of copolymer, to add the monomer which can be subjected to radical polymerizations, to the living polymer obtained in the first stage, before adding the radical initiator, and secondly, that the proportion of monomer which can be polymerized by means of radicals is low in the copolymer which is formed. Thus, it is only possible to form 1 to 2% by weight of polyacetovinyl sequences in a block polyethylene, and a few percent of polymer of the acrylic or methacrylic type in block propylene. Furthermore, according to the prior art, it scarcely seems possible to regulate the length of polyolefinic sequences other than by the polymerization temperature and/or possibly by the composition and the concentration of the catalyst system; the very practical industrial procedure, which would consist in controlling the molecular weight of the polymer during the anionic polymerization by extending or shortening the duration of this latter would be very difficult to apply to the known process, because the molecular weight quickly becomes stationary in the presence of the catalysts which are used.

The present invention provides a method which avoids the aforementioned disadvantages. It makes possible the copolymerization of all the monomers polymerizable by means of radicals and the increase as desired, even considerably if this is necessary, of the proportion of monomer fixed in the copolymer during the radical phase; thus, for example, it makes possible the introduction of 6% or more of vinyl acetate instead of 1 to 2% into a polyethylene, and 40% or more of methyl methacrylate, instead of a fraction of percent or a few percent, into a polyolefine. Moreover, the process according to the invention usually makes it possible easily to regulate the length of the chains formed by anionic catalysis in the copolymer. On the other hand, in one particular embodiment of the invention, a polymer practically free from homopolymers can be obtained.

The invention provides various advantages; in particular, it permits of improving the suitability of dyeing of different polymers by introduction into the chain of sequences capable of chemically fixing the dye; it is in fact possible to introduce sequences including functional groups, for example, amino, carboxy or other groups. By means of the present invention, it becomes possible to establish polymers which are compatible with other dissimilar polymers. The invention also permits of improving the adherence of polymers to various surfaces. Other useful applications have moreover been described in the literature referred to above.

The process according to the invention consists of introducing, into the copolymerization medium, before and/or during the anionic polymerization, an adjuvant which is formed by one or more compounds of elements belonging to the group formed by boron and the metals of Group IIB of the Periodic Table of Mendeleev; when the anionic polymerization has reached the desired degree, one or more monomers to be copolymerized are added, without deactivating the coordinated anionic catalyst and in any order, with the first polymer and an appropriate radical catalyst, and the polymerization is continued in known manner.

The adjuvant according to the invention can be represented by the formula $M(Y)_n$, in which M represents a metal belonging to Group IIB of the Periodic Table of Mendeleev, or boron; $n$ is the valency of the element M, and Y represents one or more monovalent hydrocarbon radicals, a hydrogen and/or a halogen atom, particularly chlorine.

According to one particular procedure used by the new process, the adjuvant, introduced into the copolymerization medium in the stage of carrying out the anionic polymerization, is formed by one or more organic compounds of theh aforementioned elements, these being compounds in which the element is only bonded to hydrocarbon radicals. Particularly suitable for this purpose are the derivatives of zinc and cadmium of formula $M_{Rb}^{Ra}$, in which M indicates Zn or Cd, while Ra and Rb, like or different, represent alkyl, aryl, aralkyl, alkaryl or cycloalkyl groups having up to 12 carbon atoms; by way of example, it is possible to mention diethyl zinc, diethyl cadmium, dipropyl zinc, dibutyl zinc, diphenyl zinc, etc., these examples being in no way limitative. Compounds such as zinc, cadmium or boron halides, particularly $ZnCl_2$, can also be employed.

Each of the two operational phases which constitute the process according to the invention can be effected at a temperature from $-78°C$ to $100°C$ and preferably between $0°$ and $80°C$; the temperature during the second polymerization, i.e., the radical phase, can according to circumstances be the same as or different from that of the first anionic polymerization.

The coordinated anionic catalysts employed in the first operational phase are organometallic compounds of metals of the Groups IA, IIA and/or IIIA of the periodic table of Mendeleev, accompanied by compounds of one or more transition metals of the Groups IV to VIII of the said Table. Thus, the operating procedure which is particularly practical according to the invention is that in which the anionic catalyst comprises an organic derivative, or optionally a hydride of Li, Mg, Be and/or Al with a Ti or V compound, and in which the adjuvant defined above is preferably an organo-zinc or an organo-cadmium compound.

Although this adjuvant can be introduced into the medium of the first polymerization from the start, it is preferable to add it progressively during this polymerization. It is in fact advantageous to have a certain substantially constant concentration of the said adjuvant throughout the anionic polymerization.

The proportion of this adjuvant to be employed depends inter alia on the percentage of the second monomer which it is desired to obtain in the copolymer. It is usually of the order of 0.01 to 100 moles, and preferably 0.1 to 50 moles, per mole of transition metal compound. Consequently, in the particularly practical case in which the said adjuvant is an $R'_2$ Zn or $R'_2$ Cd ($R'$ = alkyl), the content of Zn or Cd is generally from 0.01 to 100 and better still from 0.1 to 50 atoms per atom of transition metal.

As regards the proportions of organometallic catalyst and of transition metal, these proportions are those according to the prior art.

Moreover, as regards the other factors of the anionic phase of the polymerization, namely, the nature and proportion of solvent, the temperature, pressure and nature of the monomer or monomers, they are similar to those of the prior art, as described by way of example in the patents or in the works of Professor Karl Ziegler.

The second phase of the polymerization, in the presence of a catalyst which generates free radicals, is also conducted in the manner known per se. As catalysts, it is possible to use oxygen, hydroperoxides such as for example cumene hydroperoxide, paramenthane hydroperoxide, etc., peroxides such as benzoyl peroxide, lauroyl peroxide, etc., persalts such as potassium persulphate, etc., peracids, etc. In certain cases, the radical catalyst system could be formed by a combination of organo-zinc or organo-cadmium compounds with quinones, such as benzoquinone, naphthoquinone, etc., or phenols.

Among the main monomers for the polymerization or anionic copolymerization are to be considered the olefins or diolefines, such as ethylene, propylene, butene, 4-methylpent-1-ene, butadiene, isoprene, etc., which are mentioned without any limitation. It is possible to copolymerize them according to the invention with polymerizable monomers by means of radicals, such as the vinyl, vinylidene, acryl, methacryl or other monomers, taken individually or in mixtures, particularly vinyl acetate, vinyl chloride, vinylidene chloride; alkyl acrylates or methacrylates; acrylates or methacrylates of $R^1R^2$—N—R— where $R^1$ is hydrogen or a lower alkyl, $R^2$ is a lower alkyl ($C_1$ to $C_4$), R being an alkylene having 1 to 6 carbon atoms, sodium or zinc acrylates or methacrylates, etc., acrylonitrile or methacrylonitrile; styrene or its derivatives; vinylcarbazole, vinylpyridines, vinylpyrrolidones; vinyl ethers or thioethers, vinylsilanes; and monoexpoxidised dienes, such as butadiene monoepoxide or the like.

One particular embodiment of the invention which is very advantageous consists in separating the first (anionic) polymer from the medium from which it is obtained before bringing it into contact with the second monomer for the purpose of the radical copolymerization. This separation can be effected by the suspension of the said polymer in the solvent in which the anionic polymerization has taken place being filtered or centrifuged; the solvent keeping in solution the soluble fraction of the products present in the anionic polymerization medium and inter alia metallic compounds and soluble polymers of relatively low molecular weight, is thus eliminated.

The solid polymer which remains is preferably washed with the same or a different solvent, but no operation for deactivating the catalyst is carried out.

For achieving the second operational phase, it is then possible for the polymer as thus prepared to be once again brought into suspension in fresh inert liquid or even in the second monomer itself, after which the dispersion obtained has an appropriate radical catalyst added thereto. By inert liquid, is understood any liquid which does not deactivate the first polymer and does not act chemically either with the latter or with the second monomer or monomers; this liquid can thus be such as a hydrocarbon, for example, hexane, heptane, cyclohexane, benzene, etc., or a halogenated hydrocarbon, such as chlorobenzene, and particularly the same liquid which served as solvent during the first polymerization phase.

By dispersing the first polymer directly in the second monomer, it is possible by adding a radical catalyst to effect a mass copolymerization which leads to products different from those when working in solution. This procedure permits copolymers to be prepared which have very stong contents of groups of the second type, that is to say, originating from the radical catalyst.

It is interesting to note that the embodiment of the invention comprising the separation of the first polymer before the radical polymerization stage makes it possible to obtain a copolymer containing practically no homopolymers.

The examples given below illustrate the invention without limiting it; actually, the new process can be applied to other materials, within the scope of the foregoing description, and to other conditions as regards temperature and pressure used in the art.

COMPARISON TEST

To 500 ml of dry heptane, in a 1-litre reactor, are added under inert atmosphere 1 millimole (mmole) of TiCl$_3$ "AA" (Staufer Chemical Co) and 2 mmoles of triethylaluminium Al ($C_2H_5$)$_3$. Ethylene at the pressure of 1 atmosphere is injected into the reactor, brought to 45°C, after which the apparatus is kept at 45°C for 1 hour, the contents thereof being agitated at a speed of 500 r.p.m.

The ethylene excess is then driven off with a stream of nitrogen, thiis being followed by introducing into the reactor a certain quantity of radical initiator, namely, cumene hydroperoxide (Examples 1 to 23) and paramenthane hydroperoxide (Example 24), of which the concentration in mmoles is indicated in the tables setting out the results of Examples 1 to 24.

The second monomer is then added to the contents of the autoclave. The reactor, always being agitated, is heated to 40°C or 60°C, depending on circumstances, for 6 hours, after which the contents of the reactor are poured into a mixture of methanol and HCl; the precipitate thus formed is separated by filtration and washed several times with an appropriate solvent for eliminating the homopolymer; the residue is dried under vacuum at 40°–50°C, weighed and examined. The proportion of the second monomer, fixed in the form of copolymer to the polyethylene, is determined by infra-red spectral analysis.

EXAMPLES 1 to 4

Preparation of Ethylene-methyl Methacrylate Copolymer

As well as the 2 mmoles of $Al(C_2H_5)_3$ and 1 mmole of $TiCl_3$, used as anionic catalyst in the comparison test, the contents of the reactor have added thereto 6 to 12 mmoles of diethyl zinc $Zn(C_2H_5)_2$, the other operating conditions being the same; the washing solvent is acetone in Example 4; first of all the methyl methacrylate is added, followed by cumene hydroperoxide. Table I sets out the results which were found. Example 2a differs from Example 2, in that the ethylene polymerization was effected in the presence of hydrogen for lowering the molecular weight of the polymer.

TABLE I

|  | Comparison test | Examples | | | | |
| --- | --- | --- | --- | --- | --- | --- |
|  |  | 1 | 2 | 2a | 3 | 4 |
| $Zn(C_2H_5)_2$: millimoles | 0 | 6 | 12 | 12 | 12 | 12 |
| cumene hydroperoxide: mmoles | 12 | 6 | 12 | 12 | 12 | 12 |
| temperature during the radical polymerization: °C | 40 | 40 | 40 | 40 | 60 | 40 |
| methyl methacrylate: g | 20 | 41.4 | 39.3 | 39.9 | 42 | 39.7 |
| copolymer obtained: g | 65 | 68.2 | 65.7 | 22.7 | 70.6 | 72.2 |
| methacrylic homopolymer: g | 1 | 2.4 | 5.2 | 5.6 | 4.8 | 4.1 |
| methacrylate fixed in the copolymer: % by wt. | 0.65 | 21 | 30 | 24.5 | 40.5 | 33.5 |

It can be seen that the proportion of methyl methacrylate copolymerized with the ethylene has been considerably increased as a result of adding diethyl zinc to the anionic polymerization medium, that is to say, to the first operating stage: this proportion does in fact increase from 0.65% for the process according to the prior art (comparison test), to 30.5% for Example 2, which is carried out under identical conditions, except for the presence of the organo-zinc compound.

The melt indices at 190°C under 2 are 0.1 for the copolymers of Examples 1 to 4 and 1.1 for Example 2a. By comparing Examples 2 and 4, it is confirmed that the method of introducing the monomer and the hydroperoxide has little influence on the results.

The product of Example 2 was dissolved in xylene under reflux in an argon atmosphere, in the presence of the antioxidant known under the name of "IONOL". The xylene solution was added dropwise to a sufficient quantity of acetone with vigorous agitation; the formed precipitate, when dried, still contained 30% of methyacrylic groups, this proving that these latter were indeed in the copolymer form and not in the homopolymer form in the product.

A copolymer of the type of Examples 1 to 4, containing 26% by weight of methyl methacryllate, was subjected to hydrolysis in acid medium and then to successive washing operations with water, aqueous methanol and finally acetone. After the product obtained had been dried under vacuum, infra-red analysis and also elementary analysis showsed the presence therein of about 23% of methacrylic acid. This proves that the methacrylic groups were really fixed to the polyethylene.

EXAMPLES 5 to 7

Preparation of a Copolymer of Ethylene with Vinyl Acetate

In this series of polymerization reactions, 25 q of vinyl acetate were added each time after the first operational stage. Variable quantities of diethyl zinc were still used, the catalyst being the same as before. The washing of the final polymer was effected by successive extractions with acetone and benzene.

In Example 7, oxygen replaced the cumene hydroperoxide. The temperature of the second stage was 40°C.

TABLE II

|  | Comparison test | Examples | | |
| --- | --- | --- | --- | --- |
|  |  | 5 | 6 | 7 |
| $Zn(C_2H_5)_2$: mmoles | 0 | 4 | 12 | 12 |
| cumene hydroperoxide: mmoles | 12 | 12 | 12 | — |
| oxygen: mmoles | — | — | — | 12 |
| copolymer obtained: g | 68 | 69 | 55 | 46 |
| homopolymer obtained: g | 2.8 | 1 | 6.7 | 5.6 |
| vinyl acetate fixed in the copolymer: % by wt. | 0.1 | 1.2 | 2.7 | 6.3 |

Although the proportions of copolymerized vinyl acetate are smaller than those of methyl methacrylate in the preceding examples, they are still greatly increased as compared with the comparison test, because of the presence of the organo-zinc compound.

The product of Example 7 was hydrolyzed in alkali medium (NaOH, butanol, xylene). After successive washing operations with water, methanol and acetone, the copolymer was dried under vacuum. Infra-red analysis shows that all the acetate groups have been hydrolyzed into alcohol and the acetic groups remain well-fixed to the polyethylene.

EXAMPLES 8 to 11

Use of anionic polymer separated from its polymerization medium.

Examples 8 and 9 were carried out in the same way as Examples 1 and 2, with methyl methacrylate, except for the proportions of this latter. In Example 9a, the triethyl aluminium was replaced by $(C_2H_5)_2AlCl$.

On the other hand, in Examples 10 and 11, the polyethylene, precipitated during the first operating phase in heptane, was separated before the second stage. For this purpose, the suspension of this polymer, obtained after 1 hour at 45°C under 1 atm of ethylene, in the presence of 1 mmole of $TiCl_3$, 2 mmoles of $Al(C_2H_5)_3$ and respectively 6 and 12 mmoles of $Zn(C_2H_5)_2$, was filtered in inert atmosphere, the polymer thus separated was washed with heptane and then once again brought into suspension in a fresh fraction of this latter. It is to this suspension, free from soluble catalyst and soluble polymers, that the cumene hydroperoxide and the methyl methacrylate were added. The remainder of the operation was carried out as in Examples 1 and 2, that is to say, at 40°C for 6 hours, and the copolymer was extracted, washed and dried in the same way.

In example 11a, $TiCl_3$ was replaced by 1 mmole of less active $TiCl_3H$, but the ethylene pressure was 5 $kg/cm^2$ in order to compensate for this weaker catalytic activity.

In all cases, the final polymer was washed with acetone.

Table III gives the results of these Examples, which were carried out with from 6 to 12 mmoles of diethyl zinc during the first stage, that is to say, in the polymerization of the ethylene.

TABLE III

|  | Without separation | | | Previous separation of the polyethylene | | |
|---|---|---|---|---|---|---|
| Examples | 8 | 9 | 9a | 10 | 11 | 11a |
| $Zn(C_2H_5)_2$: mmoles | 6 | 12 | 12 | 6 | 12 | 12 |
| cumene hydroperoxide: mmoles | 6 | 12 | 12 | 6 | 12 | 12 |
| methacrylate: g | 39.3 | 52.3 | 41.1 | 40.1 | 56.1 | 39.2 |
| copolymer obtained: g | 65.2 | 73 | 38 | 70 | 70.2 | 83.3 |
| homopolymer of methacrylate obtained: g | 2.2 | 8 | 1 | 0.3 | 0.4 | 0.6 |
| methacrylate fixed in the copolymer: % by weight | 21.5 | 33 | 23 | 18.5 | 25 | 15 |

It is apparent from these results that the previous separation of the first polymer, in the present case polyethylene, permits a copolymer to be obtained of which the content of homopolymer of second type (polymethacrylate) is only 0.3 to 0.4 g instead of 2.2 to 8 g for the operations directly with the suspension such as that which results from the anionic polymerization. On the other hand, Examples 9a and 11a show that it is possible to replace $TiCl_3$ and the alkyl aluminum by different Ti or Al compounds.

EXAMPLES 12 to 14

Preparation of a copolymer of ethylene with dimethylamino-ethyl methacrylate

In this series of polymerization reactions, the operation is carried out in Example 1, except for the proportions of diethyl zinc and hydroperoxide, and the methyl methacrylate is replaced in each test by 25 g of dimethylamino-ethyl methacrylate. The washing solvent is acetone. Table IV sets out the results which were found.

TABLE IV

|  | Comparison test | Examples | | |
|---|---|---|---|---|
|  |  | 12 | 13 | 14 |
| $Zn(C_2H_5)_2$: mmoles | 0 | 6 | 12 | 12 |
| cumene hydroperoxide: mmoles | 12 | 12 | 12 | 24 |
| copolymer obtained: g | 90 | 82 | 65 | 30 |
| methacrylate fixed in the copolymer: | | | | |

TABLE IV-continued

|  | Comparison test | Examples | | |
|---|---|---|---|---|
|  |  | 12 | 13 | 14 |
| % by weight | 1.7 | 4.0 | 5.1 | 8.1 |

The proportions of dimethylamine-ethyl methacrylate copolymerized in Examples 12 to 14 are clearly increased as compared with the comparison example, because of the presence of the organo-zinc compound.

EXAMPLES 15 and 16

Effect of the method of introducing the monomer and the peroxide at the time of radical polymerization The anionic polymerization of the ethylene was carried out under the same conditions as those of Example 13. The polyethylene suspension was then filtered and washed and the polyethylene once again suspended in heptane in an inert atmosphere. The suspension obtained had added thereto 25 g of dimethylaminoethyl methacrylate and then 6 mmoles of cumene hydroperoxide, whereafter the procedure of Example 13 was used.

In Example 16, first of all the hydroperoxide was added, followed by the dimethyl-amino ethyl methacrylate. In both cases, the copolymer was washed by successive extractions with acetone.

TABLE V

| Examples Nos | 15 | 16 |
|---|---|---|
| $Zn(C_2H_5)_2$: millimoles | 12 | 12 |
| hydroperoxide: millimoles | 6 | 6 |
| copolymer obtained: g | 33 | 35 |
| dimethylamino-ethyl methacrylate fixed in the copolymer: % by weight | 7.6 | 7.2 |

It can be confirmed that the method of introducing the monomer and the radical initiator has no influence on the copolymers which are obtained. The quantities of homopolymers of dimethylamino-ethyl methacrylate are almost nil.

EXAMPLES 17 to 19

Preparation of copolymer of ethylene with a methyl methacrylatedimethylamino-ethyl methacrylate copolymer These tests were carried out under conditions similar to those of Example 13, only the quantities of the two monomers, methyl methacrylate and dimethylaminoethyl methacrylate, varying. The washing solvent was acetone.

TABLE VI

| Examples Nos | 17 | 18 | 19 |
|---|---|---|---|
| $Zn(C_2H_5)_2$: millimoles | 12 | 12 | 12 |
| hydroperoxide: mmoles | 12 | 12 | 12 |
| methyl methacrylate: g | 12.5 | 25 | 25 |
| dimethylamino-ethyl methacrylate: g | 12.5 | 25 | 5 |
| copolymer obtained: g | 67 | 78 | 76 |
| methacrylic copolymer fixed in the copolymer: % by weight | 6 | 12.4 | 25.8 |

EXAMPLES 20–21

Preparation of copolymer of ethylene with styrene

In this series of tests, the ethylene was polymerized at 60°C for 1 hour in the presence of variable quantities of diethyl zinc and the catalyst system formed by 1 millimole of $TiCl_3$ and 2 millimoles of triethyl aluminium $Al(C_2H_5)_3$. The polyethylene obtained was filtered, washed and suspended again in heptane. 30 g of styrene and cumene hydroperoxide was then added and copolymerization allowed to take place at ambient temperature for 20 hours.

The final copolymer was washed by successive extractions of benzene and acetone.

The results obtained are set out in Table VII.

TABLE VII

| | Comparison test | Examples 20 | Examples 21 |
|---|---|---|---|
| $Zn(C_2H_5)_2$: millimoles | 0 | 2 | 12 |
| cumene hydroperoxide: mmoles | 12 | 6 | 6 |
| copolymer obtained: g | 99 | 50 | 41.2 |
| styrene fixed in the copolymer: % by wt. | 0 | 6.4 | 13 |

It is seen that the quantity of styrene fixed in the copolymer increases considerably when the anionic polymerization of the ethylene is effected in the presence of diethyl zinc.

EXAMPLES 22–23

Copolymerization of Ethylene with Styrene

The operational procedure is the same as for Examples 20 and 21, but the free radical or second step copolymerization takes place at temperatures of 40° and 60°C respectively, and the influence of the proportion of styrene is investigated.

In all cases, 12 mmoles of $Zn(C_2H_5)_2$ and 6 mmoles of cumene hydroperoxide are used.

The final washing is effected with acetone and benzene. The results, set out in Table VIIA, concern the second polymerization, i.e., the radical copolymerization.

EXAMPLE 24

Preparation of copolymer of ethylene with vinyl chloride

In this test, the ethylene polymerization was effected as in Example 1. The polyethylene formed was filtered, washed and suspended in heptane, in which had previously been dissolved 30 g of vinyl chloride. The radical initiator, namely, paramenthane hydroperoxide, was then added. The radial polymerization was carried out at 40°C for 4 hours.

The copolymer obtained was washed by successive extractions with tetrahydrofuran.

Table VIII sets out the results obtained.

TABLE VIII

| | Comparison test | Example |
|---|---|---|
| $Zn(C_2H_5)_2$: millimoles | 0 | 6 |
| paramenthane hydroperoxide: mmoles | 6 | 6 |
| copolymer obtained: g | 38.5 | 29.5 |
| vinyl chloride in the copolymer % by weight | 0 | 3.7 |

The quantity of vinyl chloride fixed in the copolymer of Example 24 is substantial, because of the presence of the organo-zinc compound.

EXAMPLE 25

Bulk copolymerization of polyethylene with methyl methacrylate

The operations are similar to those of Example 11, except that no solvent is used and with 240 g of methacrylate instead of 56.1 g.

The first step, i.e., the formation of polyethylene, lasts only 30 minutes, instead of 60 minutes in Example 11.

The quantity of copolymers obtained is 60 g and the content of methacrylate fixed in this product is found to be 50% by weight after extraction with acetone and chloroform.

EXAMPLE 26

Bulk preparation of an ethylene-styrene copolymer

The operating conditions are those of Example 22, except that the radical polymerization takes place without solvent, in the presence of 240 g of styrene. 80 g of copolymer are obtained, containing 27% by weight of fixed styrene.

EXAMPLES 27 and 28

Preparation of an Ethylene-Styrene-Methyl Methacrylate Terpolymer

The first step consists in polymerizing ethylene under the conditions of Examples 8 to 11. The polyethylene obtained is separated by filtration and washed as in the

TABLE VIIA

| Examples Nos. | 22 | 22a | 22b | 22c | 23 | 23a |
|---|---|---|---|---|---|---|
| temperature °C | 40 | 40 | 40 | 40 | 60 | 60 |
| duration of copolymerization, in hours | 4 | 4 | 4 | 4 | 2 | 2 |
| styrene: g | 30 | 60 | 100 | 150 | 30 | 150 |
| copolymer obtained: g | 86 | 70 | 68 | 110 | 73 | 115 |
| styrene fixed in the copolymer: % | 3.8 | 7.7 | 13 | 20 | 2.6 | 15 | aforesaid examples, and then suspended in fresh heptane.

In the second step, the suspension obtained has cumene hydroperoxide, styrene and methyl methacrylate added thereto: the polymerization is then conducted as before at 40°C. The final copolymer is washed by several extractions with acetone and chloroform.

| The characteristics of these two examples are: | | |
|---|---|---|
| Example No. | 27 | 28 |
| $Zn(C_2H_5)_2$, mmoles | 12 | 12 |
| cumene hydroperoxide, mmoles | 6 | 12 |
| methyl methacrylate, g | 20.5 | 32 |
| styrene, g | 22.2 | 10.2 |
| product obtained, g | 41 | 62.9 |
| fixed methacrylate, % by weight | 2.7 | 3.6 |
| fixed styrene, % by weight | 2.8 | 2.2 |
| extracted homopolymer, g | 0.4 | 0.6 |

EXAMPLE 29

Fixation of hexyl methacrylate on polyethylene

The first operational step is that of Examples 8 to 11, with separation of the formed polyethylene. After filtration and washing operations, this polymer has hexyl methacrylate added thereto, for the second step. After this latter, the copolymer obtained is washed with acetone and chloroform.

| The main characteristics of this example are: | |
|---|---|
| $Zn(C_2H_5)_2$, mmoles | 12 |
| cumene hydroperoxide, mmoles | 12 |
| temperature of the second step, °C | 40 |
| duration of the second step, hours | 4 |
| hexyl methacrylate used, g | 60.9 |
| weight of copolymer obtained, g | 97.8 |
| % of methacrylate in the copolymer | 2.9 |

In a comparison test, identical in all respects, except that the first polymerization was effected without diethyl zinc, the product obtained did not contain any hexyl methacrylate.

EXAMPLE 30

Preparation of ethylene-vinylcarbazole copolymer

In the first operational step, the ethylene was polymerized at 40°C for 30 minutes in the presence of 6 or 12 mmoles of diethyl zinc and the catalyst system formed by 1 mmole of $VOCl_3$ and 3 mmoles of $(C_2H_5)_2AlCl$, in heptane.

At the end of this first polymerization, 25 g of vinylcarbazole and oxygen are introduced into the reaction medium and the copolymerization is allowed to proceed at ambient temperature for 16 hours. The product obtained was subjected to extractions with hot benzene.

The following data characterize these operations:

| Example | Comparison | 30 | 30a |
|---|---|---|---|
| diethyl zinc, mmoles | 0 | 6 | 12 |
| oxygen zinc, mmoles | 1.5 | 3 | 6 |
| copolymer obtained, g | 32 | 32 | 28 |
| % by weight of vinylcarbazole fixed in the copolymer | 0.3 | 3.5 | 5.6 |

EXAMPLE 31

Preparation of an ethylene-polyacrylonitrile copolymer

The general conditions being those of the comparison test described above, 1 mmole of $TiCl_3$ of "AA" quality, 2 mmoles of triethyl aluminium and 12 mmoles of diethyl zinc in 500 ml of heptane are used in the first anionic step; the anionic polymerization lasted 1 hour at 45°C; the ethylene pressure was 0.5 kg/cm².

In a first test, the reaction medium was used as such for the second operational step, while in the two other tests (31a and 31b), this second radical step was carried out with previously separated polyethylene.

For carrying out the second step, 40 g of acrylonitrile and 6 or 12 mmoles of cumene hydroperoxide were added in each case, after which the medium was kept at 40°C for 6 hours. The copolymer obtained was washed with dimethyl formamide for 48 hours by successive extractions.

The results of these tests are below:

| | Comparison | No. 31 without separation of the polyethylene | No. 31a with separation | No. 31b |
|---|---|---|---|---|
| $ZnEt_2$ mmoles | 0 | 12 | 12 | 12 |
| hydroperoxide, mmoles | 12 | 12 | 12 | 6 |
| copolymer obtained, g | 40 | 59 | 47 | 70 |
| polyacrylonitrile (homopolymer g) | 1 | 6.2 | 1.3 | 14.6 |
| % by weight of acrylonitrile fixed in the copolymer | 0.3 | 8.1 | 17.8 | 17 |

It is seen from these results that the proportion of acrylonitrile fixed in the copolymer was considerably increased by the fact of adding diethyl zinc to the medium of the anionic polymerization: this proportion does in fact increase from 0.3% for the comparison test to 17.8% for test 31a. Furthermore, the previous separation of the first polymer makes it possible to obtain a considerably reduced content of radical homopolymer, that is to say, of polyacrylonitrile.

The copolymer of Example 31a was subjected to several extractions in a Soxhlet apparatus with xylene for 78 hours to eliminate the homopolyethylene; it was then found that more than 70% of the polyethylene chain was well-fixed to the copolymer and could not be extracted. With a synthetic mixture of polyethylene with 17.8% of polyacrylonitrile, the same type of extraction resulted in a complete separation of the two homopolymers.

EXAMPLE 32

Propylene-methyl methacrylate copolymer

The first operational step, which consists in polymerizing the propylene, is carried out in 500 ml of heptane at 65°C, under a propylene pressure of 4 kg/cm², in 30 minutes. The catalyst system comprises 1 mmole of TiCl₃ of "AA" quality and 2 mmoles of triethyl aluminium. The adjuvant is formed by 12 mmoles of diethyl zinc.

Without separation of the formed polyproplene, 39.5 g of methyl methacrylate and 12 mmoles of cumene hydroperoxide are added to the reaction medium. The radical reaction is then continued for 4 hours at 40°C.

A comparison test is carried out in the same way, except that the diethyl zinc is not introduced into the reaction medium.

The following results are obtained:

|  | Comparison test | Example 32 |
|---|---|---|
| weight of copolymer, g | 128.2 | 92.7 |
| methacrylate homopolymer, g | 0.75 | 2.9 |
| methacrylate fixed, % by wt. | 1 | 19 |

EXAMPLE 33

Propylene-methyl methacrylate copolymer

The first operational step is carried out in the same way as in Example 32, but the triethyl aluminium is replaced by $(C_2H_5)_2AlCl$, used at a rate of 4 mmoles with 2 mmoles of $TiCl_3$; the anionic polymerization lasts 60 minutes.

The radical step takes place at 40°C for 4 hours.

The copolymer formed is extracted several times with acetone.

The following data characterize this example:

| Example | Comparison | 33 | 33a |
|---|---|---|---|
| diethyl zinc, mmoles | 0 | 12 | 12 |
| cumene hydroperoxide, mmoles | 12 | 6 | 12 |
| methyl methacrylate introduced | 40.3 g | 39.5 g | 41.9 g |
| weight of formed polymer | 62.2 g | 48.7 g | 40.7 g |
| methacrylate homopolymer formed | 0 g | 1.8 g | 4.6 g |
| fixed methacrylate % | 0 | 5.2 | 29 |

EXAMPLE 34

Propylene-acrylonitrile copolymer

The first anionic step took place under a propylene pressure of 4 kg at 65°C in 30 minutes, with 1 mmole of $TiCl_3$, 3 moles of triethyl aluminium and 12 mmoles of diethyl zinc. Without previous separation of the formed polypropylene, 20 g of acrylonitrile and the radical catalyst were added to the medium. This addition is effected in two different ways in two concurrent tests:

No. 34A, first of all the acrylonitrile and then the peroxide are added, while in No. 34B, this order of introduction is reversed.

After 6 hours of radical polymerization, the copolymer obtained is washed several times by extraction in dimethyl formamide.

The following results are obtained:

|  | Comparison | 34A | 34B |
|---|---|---|---|
| ZnEt₂, mmoles | 0 | 12 | 12 |
| cumene hydroperoxide, mmoles | 2 | 12 | 12 |
| temperature, °C | 40 | 45 | 40 |
| polymer obtained, g | 105 | 55 | 60 |
| acrylonitrile homopolymer, g | 0 | 14.2 | 0 |
| acrylonitrile fixed in the copolymer, % | 0 | 3.1 | 3 |

It is seen that the order in which the reactants are introduced in the second step does not modify the percentage of acrylonitrile fixed to the propylene; on the contrary, it has considerable influence on the formation of acrylonitrile homopolymer acrylonitrile homopolymer.

EXAMPLE 35

Propylene-Acrylonitrile-Styrene Terpolymer

The conditions of the first step are: 300 ml of heptane, 1 mmole of $TiCl_3$, 3 mmoles of triethyl aliuminium and 12 mmoles of diethyl zinc, duration 10 minutes at 65°C under a propylene pressure of 4 kg/cm².

One test (35) is effected without separation of the formed polypropylene, while in the other two tests (35a and 35b), this polymer is separated and washed before being subjected to the second radical step of the operation.

In the second step, first of all 20 g of acrylonitrile, then 20 g of styrene and finally the cumene hydroperoxide, in the quantity indicated below, are introduced. The polymerization lasts 6 hours at 45°C.

The copolymer obtained is washed several times with dimethyl formamide.

The characteristics of this example are:

|  | Comparison | No. 35 | No. 35a | No. 35b |
|---|---|---|---|---|
| ZnEt₂, mmoles | 0 | 12 | 12 | 12 |
| hydroperoxide, mmoles | 6 | 12 | 12 | 6 |
| copolymer obtained, g | 50 | 63 | 55 | 50 |
| acrylonitrile fixed in the copolymer, % | 0.5 | 1.6 | 4.8 | 6.1 |
| fixed styrene, % | 0.3 | 1.3 | 3.8 | 5.2 |

EXAMPLE 36

Propylene-dimethylamino ethyl methacrylate copolymer

The conditions of the first step were: 1 mmole of $TiCl_3$, 2 mmoles of triethyl aluminum, 12 mmoles of diethyl zinc, temperature 65°C duration 10 minutes, propylene pressure 4 kg/cm². The second step followed without filtration of the polypropylene.

25 g of dimethylamino ethyl methacrylate are then added and heating takes place at 65°C for 16 hours.

The copolymer obtained is washed by being extracted with acetone. The results obtained are:

|  | Comparison (without ZnEt₂) | 36a | 36b |
|---|---|---|---|
| cumene hydroperoxide, mmoles | 6 | 6 | 12 |
| copolymer obtained, g | 46 | 30 | 53 |

-continued

|  | Comparison | 36a | 36b |
|---|---|---|---|
| fixed methacrylate, % | 0.5 | 4.3 | 6.7 |

The solid copolymer obtained is suspended in 100 ml of a monosulphonated acid dye solution known under the commercial name of "Bleu Dimacide Lumiere N2JL". Sulphuric acid is added until the pH is 2.5 and the suspension is agitated for 90 minutes at 100°C. The polymer is then removed from the dye bath and washed with a 5% aqueous solution of sodium acetate; successive washing operations are carried out with water until the filtrate is colourless.

While the copolymer of the comparison test is only very slightly dyed, the sequential copolymers of Examples 36a and 36b show a much more intense colouring, which is from blue to very deep blue. Extractions with acetone and heptane under heat on these copolymers did not effect the intensity of the colouring; on the other hand, on a synthetic mixture of polypropylene (PP) and polydimethyl-aminoethyl methacrylate (PDMAEMA), dyed under the same conditions, a blue colouring is obtained, which is greatly diminished after the acetone and heptane extractions. The results show that the PDMAEMA sequence remains well-fixed to the PP.

EXAMPLE 37

Ethylene-propylene-acrylonitrile copolymers

The first step is effected under the general conditions of Example 1, in 410 ml of heptane at 20°C, for 15 minutes, under atmospheric pressure, with 0.36 mmole of $VCl_4$, 0.9 mmole of tri-n-hexyl aluminium, 8 mmoles of $ZnEt_2$, the propylene-ethylene ratio being 2 and the total rate of flow 150 liters/hour.

In the second step, 16 g of acrylonitrile are added and polymerization is allowed to take place at 40°C for 3 hours. The results obtained are:

|  | Comparison | No. 37 |
|---|---|---|
| $ZnEt_2$, mmoles | 0 | 8 |
| cumene hydroperoxide, mmoles | 6 | 6 |
| copolymer obtained, g | 15 | 16 |
| fixed acrylonitrile, % | 1 | 10 |

EXAMPLE 38

Ethylene-propylene-methyl methacrylate copolymer

The conditions of the first step are identical with those of Example 37.

In the second step, 40 g of methyl methacrylate are used at 40°C for 3 hours. The results obtained are:

|  | Comparison | No. 38 |
|---|---|---|
| $ZnEt_2$, mmoles | 0 | 8 |
| cumene hydroperoxide, mmoles | 6 | 6 |
| copolymer obtained, g | 15 | 17 |
| methacrylate fixed in the copolymer, % by weight | 0.5 | 7 |

EXAMPLE 39

Ethylene-methyl methacrylate copolymer

Operations in a stainless steel 10-liter reactor.

The first step is effected in 5 liters of heptane, under an ethylene pressure of 0.6 kg/cm² at 50°C, for 90 minutes, with 10 mmoles of $TiCl_3$, 20 mmoles of $Et_3Al$ and 120 mmoles of $Et_2Zn$, used from the start, and then 180 mmoles introduced continuously.

After filtering and washing operations on the formed polyethylene, the second step follows at 60°C for 2 hours: 4 liters of heptane, 120 mmoles of cumene hydroperoxide and 406.3 g of methyl methacrylate.

After extraction with acetone and chloroform, 1237 g of copolymer with 22.5% of methacrylate are then obtained.

EXAMPLE 40

Ethylene-styrene copolymer

Operation in a stainless steel 10-liter reactor.

The first step takes place in 5 liters of heptane, under an ethylene pressure of 0.6 kg/cm² at 50°C for 90 minutes, with 10 mmoles of $TiCl_3$, 20 mmoles of $Et_3Al$ and 180 mmoles of $Et_2Zn$, used from the start, and then 180 mmoles introduced continuously.

After filtering and washing operations on the formed polyethylene, the second step is conducted with 2 liters of heptane, 1388 g of styrene and 120 mmoles of cumene hydroperoxide at 60°C for 4 hours.

The weight of copolymer obtained is 1050 g, containing 23.5% of fixed styrene.

EXAMPLE 41

Use of diphenyl zinc as adjuvant

The test is carried out under the same conditions as in Example 4, except for the adjuvant, which here is diphenyl zinc (12 mmoles) instead of diethyl zinc:

| copolymer obtained | 75 g |
|---|---|
| methacrylic homopolymer | 0 g |
| methacrylate fixed in the copolymer, | 30% by weight |

It is seen that by using the diphenyl zinc, the formation of methyl methacrylate homopolymer is completely eliminated.

EXAMPLE 42

Use of diethyl cadmium as adjuvant

The conditions of the first step are: 1 mmole of $TiCl_3$, 2 mmoles of TEA, 12 mmoles of $CdEt_2$, temperature 45°C, duration 1 hour, ethylene pressure 0.5 kg/cm², heptane 500 ml.

Without separation of the polyethylene, the second step is carried out: 40 g of acrylonitrile, at 40°C for 6 hours, 12 mmoles of cumene hydroperoxide. The results obtained are:

| copolymers obtained | 60 g |
|---|---|
| acrylonitrile homopolymer | 5 g |
| acrylonitrile fixed in the copolymer, | 7% by weight |

It is seen that the $CdEt_2$ has the same effect as the $ZnEt_2$.

EXAMPLE 43

Propylene-methyl methacrylate copolymer: dipropyl zinc

The catalyst system and adjuvant: $TiCl_3$-$Et_3Al$-dipropyl zinc additive (12 mmoles).

The two operational steps are identical with those of Example 32.

The results obtained are: weight of copolymer 102 g, methacrylic homopolymer 3 g, fixed methylacrylate 17% by weight.

It can be seen that the dipropyl zinc has the same effect as the diethyl zinc.

EXAMPLE 44

$ZnCl_2$ as adjuvant in the ethylene-methyl methacrylate copolymerization

To 500 ml of dry heptane, in a 1-liter reactor, are added in an inert atmosphere 1 mmole of $TiCl_3$, 4 mmole of zinc dichloride and 10 mmoles of triethyl aluminium. The reactor is brought to 15°C and ethylene is injected at a pressure of 1 atmosphere for 1 hour, while stirring at 500 r.p.m.

The ethylene is then driven off by a stream of nitrogen and 4 mmole of cumene hydroperoxide and 40 g of methyl methacrylate are introduced. The reactor is kept at 40°C for 6 hours. The contents are then poured into a methanol-HCl mixture; the polymer thus formed is washed several times with acetone in order to eliminate the methacrylate homopolymer.

68 g of copolymer are then obtained, containing 10% by weight of methyl methacrylate and 2 g of methacrylic homopolymer.

EXAMPLE 45

Triethyl boron as adjuvant: ethylene-vinyl chloride copolymerization

To 500 ml of dry heptane in a 1-liter reactor are added, in an inert atmosphere, 1 mmole of $TiCl_3$, 2 mmoles of triethyl aluminium and 6 mmole of triethyl boron. The reactor is brought to 45°C and ethylene is injected at a pressure of 1 atmosphere for 1 hour while stirring at 500 r.p.m.

The ethylene is then driven off by a stream of nitrogen and 6 mmole of cumene hydroperoxide and 40 g of vinyl chloride are introduced. The reactor is then kept at 0°C for 6 hours. The contents are then poured into a methanol-HCl mixture. The polymer thus formed is washed several times with tetrahydrofuran.

In this way, 70 g of a copolymer containing 20% by weight of vinyl chloride are obtained.

EXAMPLE 46

The operations of Example 1 are repeated, with diethyl beryllium instead of triethyl aluminium. The same results are obtained.

The copolymers according to the invention are also used as binders for mixtures of corresponding homopolymers which normally are incompatible; these binders provide the compatibility of these homopolymers. Thus, in the case of copolymers of ethylene of propylene with acryl, vinyl or styrene compounds, this binding property becomes noticeable from a content of 8% of acryl, vinyl or styrene compound and more especially beyond 15%; excellent results are obtained with copolymers of olefine with 15 to 50% by weight of a methacrylate or acrylate, acrylonitrile or styrene.

EXAMPLE 47

Bulk copolymer ethylene-acrylonitrile

First working phase: $TiCl_3$ 1 millimole; $AlEt_3$ 2 millimoles; $ZnEt_2$ 12 millimoles; temperature 45°C; duration 1 hour; ethylene pressure 0.5 kg/cm².

After filtration and washing the product obtained, the second working phase is: cumene hydroperoxide 12 millimoles; acrylonitrile 240 g; 6 hours at 40°C.

Copolymer obtained: 180 g

% of acrylonitrile fixed, as determined after successive extractions with dimethylformamide: 53.1%.

EXAMPLE 48 to 50

Study of the influence of concentration in $TiCl_3$

Preparation of an ethylene-methylmethacrylate copolymer. The two operating phases are carried out according to the general procedure of example 1, without washing polyethylene before the second phase, i.e., the free radical one. The first polymerization is effected at 45°C, during 1 hour, under a pressure of 0.5 kg/cm² of ethylene, with 2 mmoles $AlEt_2$ and 12 mmoles $ZnEt_2$, while the amount of $TiCl_3$ varies from 1 to 3 mmoles in the three examples. In the second phase 12 mmoles of cumene hydroperoxide are added and 100 g of methylmethacrylate.

The following results are obtained.

| Example no. | 48 | 49 | 50 |
| --- | --- | --- | --- |
| $TiCl_3$ mmoles used | 1 | 2 | 3 |
| Copolymer obtained, g | 74.1 | 67 | 81 |
| Homo-polymethacrylate formed, g | 10.6 | 20.9 | 20.2 |
| % methacrylate bound in the copolymer | 38.8 | 39 | 40 |

It is thus seen that the concentration of $TiCl_3$ has no substantial influence on the % of methacrylate bound with polyethylene; however, the amount of homopolymer is less as that concentration is lower.

EXAMPLE 51

Preparation of styrene-methyl methacrylate copolymer

A — Without special adjuvant

To 200 ml of dry heptane, in a reactor of 500 ml, 100 ml of anhydrous distilled styrene are introduced under inert gas atmosphere. The solution obtained, while at 80°C, is added with 4 millimoles $TiCl_3AA$ (Staufer Chemical Co.) and 12 mmoles of triethyl-aluminium $Al(C_2H_5)_3$. Then it is kept at 80°C for 5 hours.

The polymer thus obtained is washed with anhydrous heptane in inert atmosphere (free from oxygen) until monomer styrene and organometallic soluble compounds are removed.

After the last filtration of the above washing, the polymer continues to be kept in an inert atmosphere, it is mixed with 100 ml heptane, 40 g methylmethacrylate and 6 mmoles cumene hydroperoxide, at 40°C, and this temperature is maintained during 3 hours.

The material obtained is washed with a mixture methanol + HCl, it is rinsed with methanol and dried; thus, 11.3 g of copolymer are obtained with contain 4.1% methylmethacrylate; the copolymer is subjected to the extraction of homopolymethylmethacrylate with acetonitrile for 24 hours in a Soxhlet; after the extraction only 0.4% of methylmethacrylate is found in the material.

B — With an adjuvant according to the invention

The operations of the above run "A" are repeated, but 6 mmoles of diethyl-zinc $Zn(C_2H_5)_2$ are added to the initial solution simultaneously with the titanium trichloride AA. Then the amount of copolymer obtained is 30 g instead of 11.3 g in the preceding example, and the copolymer contains as much as 69% of methyl methacrylate (instead of 4.1%). After extraction with acetonitrile, as above, the proportion of methyl methacrylate remaining in the polymer is 17%. Comparison with run "A" shows that the addition of diethyl zinc to the reaction medium results in a considerable increase of the amount of methyl methacrylate bound in the copolymer formed.

EXAMPLE 52

Producing polystyrene

C — Only with anionic catalyst

In a vessel of 500 ml there are introduced 100 ml of heptane to which 50 ml of anhydrous distilled styrene are added in inert atmosphere. The mixture is further added with 2 mmoles of $TiCl_3$ AA and 6 mmoles of triethyl aluminium, and it is kept at 80°C for 5 hours. The polymer thus obtained in washed with a mixture methanol-HCl, and that leaves 12.5 g of polystyrene having a fraction of 20% which is soluble in methyl-ethyl-ketone by refluxing in a Soxhlet during 24 hours. X-ray analysis does not show any isotacticity in the methyl-ethyl-ketone soluble fraction.

D — Anionic and free radicals catalysts

The run according to "C" above is repeated, but after the 5 hours of heating at 80°C the content of the vessel is cooled down to 40°C and 6 mmoles of cumene hydroperoxide are added. The mixture is then left for 3 hours.

At the end of this period, the polymer obtained is washed, as in run "C", with HCl containing methanol; the weight of washed material is 12.6 g, that means substantially the same as above, and it also contains 20% of polystyrene soluble in methyl- ethyl-ketone by refluxing in a Soxhlet for 24 hours. X-ray analysis does not reveal the presence of isotactic polymer in the ketone soluble polymer.

The run "D" proves that no styrene molecules fixed to the initially formed polystyrene molecular after the introduction of cumene hydroperoxide into the reaction medium.

E — Anionic and free radicals catalysts in the presence of an additive according to the invention Operation is carried out as in run "D", but at the start, simultaneously with the $TiCl_3$ and triethyl aluminium 6 mmoles of $Zn(C_2H_5)_2$ are added to the initial mixture. Then, after cooling to 40°C, adding the cumene hydroperoxide and letting react for 3 hours, 20 g of polymer are obtained (instead of 12.5 g above), which contain 50% (instead of 20% above) of methyl-ethyl-ketone soluble polystyrene, and the soluble fraction shows in X-ray analysis a rather strong isotacticity.

That proves the presence of diethyl zinc resulted in the fixation of styrene sequences, during the free radicals catalyst action (cumene hydroperoxide), onto the polystyrene formed in the first polymerization step (with $TiCl_3$ and $AlEt_3$). Now the adjuvant makes it possible to produce isotactic polystyrene.

EXAMPLE 53

To 500 ml of dry heptane in a 1 liter flask, under inert atmosphere, 1 millimole of $TiCl_3$, 2 millimoles of triethylaluminum, 0.5 millimoles of $TiCl_4$ and 12 millimoles of diethylzinc are added successively.

The content of the flask is kept at 55°C while a stream of ethylene is passed therethrough under 1 atmosphere pressure during 30 minutes.

The polyethylene thus obtained is filtered, washed with heptane and then resuspended in 300 ml of heptane; to the suspension formed 40 g of methyl-methacrylate and 12 millimoles of cumene hydroperoxide are added, and the mixture is kept at 40°C for 4 hours. After that time the material is poured into a mixture methanol-HCl to precipitate polymer; this is separated by filtration, washed with acetone and chloroform to remove homopolymer, and dried.

Now, 80 g of a copolymer are obtained, with contain 25% by weight of polymethylmethacrylate bound to polyethylene.

EXAMPLE 54

As in the preceding example, 500 ml dry heptane are added successively with 1 mmole $TiCl_4$, 4 mmoles triethyl-aluminium and 6 mmoles diethyl-zinc. The flask is heated to and kept at 55°C; a stream of ethylene is injected into the liquid under 0.5 atmosphere during 30 minutes, while a supplemental amount of 6 mmoles diethyl-zinc is progressively added in the course of the 30 minutes operation.

The polyethylene, thus produced, separated by filtering and washed with heptane, is suspended in 350 ml of styrene. The suspension is added with 12 mmoles of cumene hydroperoxide and kept at 40°C for 4 hours. After that time, the polymeric material formed is precipitated as above, and homopolymer is extracted therefrom with benzene; the remainder is a copolymer which contains 25% by weight of polystyrene bound to polyethylene.

EXAMPLE 55

Operation is carried out as in example 53, but the amount of $TiCl_3$ is 0.25 mmole, $TiCl_4$ is replaced by 0.03 mmole $Ti(OC_3H_7)_4$ (tetrapropyl titanate), and the total amount of diethyl-zinc is 24 mmoles, 6 of which are introduced at the start and 18 in continu during the polymerization of ethylene. The polymerization is carried out at 80°C during 20 minutes, the pressure of ethylene being of 4 atmospheres. On the other hand the methyl methacrylate of example 53 is replaced by 200 ml of styrene.

After the removal of homopolymer by extraction with benzene, 156 g of copolymer are obtained, 18% by weight of which are constituted of polystyrene combined with polyethylene.

EXAMPLE 56

Catalyst on a magnesia containing substrate

The general operating procedure is that of example 53, but the compound of transition metal used is constituted by 0.8 gram of the product formed by reacting $TiCl_4$ with $Mg(OH)Cl$, having 0.24% by weight of Ti. Triethyl-aluminium is substituted with 5 mmoles triisobutyl-aluminium. The total amount of diethyl-zinc is now 15 mmoles, 6 of which are introduced at the start and 9 in continu during the polymerization of ethylene. The polymerization is carried out at 80°C for 1 hour, the pressure of ethylene being 5 atmospheres. In the second polymerization methylmethacrylate is replaced by 200 ml of styrene while the amount of cumene hydroperoxide catalyst is reduced to 6 mmoles. After the extraction of homopolymer with benzene, 150 g of styrene-ethylene copolymer are obtained, having 18% weight content of styrene.

EXAMPLE 57

Catalyst on magnesia containing substrate

Operating procedure is like that of example 56, except that the titanium compound used in the product of reacting $TiCl_4$ with $Mg(OC_2H_5)_2$; 25 mg of it are used, which contain 4.2% by weight of Ti. 2 mmoles of triethyl-aluminium are employed. As to diethyl-zinc, its total amount is 24 mmoles, 6 of which are introduced at the start and 18 in continu in the course of the polymerization of ethylene; this is effected at 80°C for 1 hour under 2 atmospheres of ethylene. In the second polymerization step 12 mmoles of cumene hydroperoxide are employed. 236 g of copolymer having 27% by weight of bound polystyrene are obtained.

EXAMPLE 58

In an operation similar to that of example 57, 22 mmoles of triethyl-aluminium are used instead of the above 2 mmoles; diethyl-zinc is replaced by 10 mmoles of zinc chloride ($ZnCl_2$).

In the second polymerization step the amount of dumene hydroperoxide is reduced to 6 mmoles.

250 g of copolymer are obtained, in which 27% by weight of polystyrene are bound with polyethylene.

EXAMPLE 59

Operating conditions are the same as in example 56 except that $TiCl_4$ is replaced by 0.5 mmole of $VCl_4$, and in the second polymerization 6 mmoles only of cumene hydroperoxide are employed. Then 50 g of copolymer are produced and they contain 20% by weight of polystyrene fixed to polyethylene.

EXAMPLE 60

Ethylene is polymerized in the conditions described in example 1. The polymer formed is separated by filtering, it is washed and then suspended in fresh heptane. To its suspension cumene hydroperoxide is added, as well as a mixture of acrylonitrile and styrene; the resultant material is kept at 40°C during 4 hours. That leads to the formation of a polymerizate which is filtered off and subjected to washings with dimethylformamide to extract homopolymer therefrom. The remaining copolymer is dried and weighed.

The following table reports the amounts of materials used and those of copolymer obtained.

| Example | 60a | 60b |
|---|---|---|
| Millimoles of diethyl-zinc used | 12 | 24 |
| Millimoles of cumene hydroperoxide | 12 | 12 |
| Grams of styrene added | 28 | 60.8 |
| Grams of acrylonitrile added | 9.6 | 19.2 |
| Grams of copolymer obtained | 60 | 150 |
| Weight % of acrylonitrile fixed | 30.8 | 40.3 |
| Weight % of styrene fixed | 27 | 25 |

EXAMPLE 61

In an operation similar to that of example 22C the amount of diethyl-zinc is changed to 24 mmoles. Cumene hydroxide is replaced by 12 mmoles of lauroyl-peroxide. The 170 g of copolymer, which are then obtained, have a ponderal content of 37% polystyrene fixed to polyethylene.

EXAMPLE 62

Ethylene is polymerized in conditions similar to those of example 1, except that operation is carried out at 60°C, and the amount of $(C_2H_5)_2Zn$ employed is 24 mmoles, 12 of which are introduced at the start, while the remaining 12 mmoles are added in continu to the polymerization medium during the whole time of reaction.

The polyethylene thus produced is filtered off, washed with heptane, and resuspended in a fraction of heptane.

To the suspension formed 12 mmoles of cumene hydroperoxide and 40 grams of methyl-acrylate are added, and the mixture is kept at 40°C for 4 hours. A polymeric material is obtained, which is separated and treated as described in example 1. Now 145 g of copolymer, having 28% by weight of methyl polyacrylate bound to polyethylene, are obtained.

EXAMPLE 63

Four mixtures of plastic materials are prepared in a double-screw Welding extruder, the screws of which turn at 100 r.p.m. (rotations per minute). Temperature is kept at 200°C. The product obtained is then granulated and injected into a BATTENFELD 10VP25 press.

Samples of each obtained pressed material are subjected to mechanical tests the results of which are given in the following table. The starting plastics are designated by
PMMA - polymethylmethacrylate,
PEHD - high density polyethylene,
PE-PMMA/20 - copolymer according to the present application, formed of polyethylene on which 20% polymethylmethacrylate were fixed.

| Composition % | A | B | C | D |
|---|---|---|---|---|
| PMMA | 42.5 | 37.5 | 35 | 25 |
| PEHD | 67.5 | 37.5 | 65 | 25 |
| PE-PMMA | 0 | 25.0 | 0 | 50 |
| Elastic limit, kg/cm$^2$ | 320 | 480 | 330 | 360 |
| Elongation at break, % | 28 | 30 | 30 | 40 |
| Tensil-impact kgcm/cm$^2$ | 65 | 70 | 65 | 160 |
| Flexural strength (Dynstat) kg/mm$^2$ | 5.5 | 8.5 | 5 | 8 |

As seen the results of B and D, with copolymers of the invention, are better than those of A and C.

On the other hand, ultrafine fihus, obtained by hot pressing 15 $\mu$ thick leaflets cut by means of a microtome from the above materials, show, under microscope, heterogeneities in A and C, while B and D appear quite homogeneous.

EXAMPLE 64

By the method of example 1 two mixtures E and F are prepared. They contain the same polyethylene PEHD as above and:

Luran TR 2503 — a styrene-acrylonitrile polymer of the BASF Company,

PE-PAS — a copolymer styrene-acrylonitrile according to the present invention, having 75% polyethylene and 25% polyacrylonitrile-styrene formed of 26% acrylonitrile with 74% styrene.

The following results were obtained:

| Composition % | E | F |
|---|---|---|
| PEHD | 76.25 | 60 |
| LURAN | 23.75 | 15 |
| PE-PAS | 0 | 35 |
| Tensil strength kg/cm² | 300 | 600 |
| Tensil-impact kgcm/cm² | 119 | 350 |
| Rockwell hardness (ASTM D-785) | 110.4 L | 123.2 L | as seen a considerable increase in strength and hardness is obtained by the use of PE-PAS; moreover samples F are much more homogeneous than E, under microscope.

EXAMPLE 65

Mixtures G and H are prepared by the same procedure as above.

PHMA designates polyhexylmethacrylate.

PE-PHMA means a copolymer according to the invention of 10% polyhexylmethacrylate fixed on 90% polyethylene:

| Composition % | G | H |
|---|---|---|
| PEHD | 80 | 50 |
| PHMA | 20 | 0 |
| PE-PHMA | 0 | 50 |
| Elastic limit kg/cm² | 250 | 200 |
| Tensil-impact kgcm/cm² | 550 | 1300 |
| Resistance to "tensil-cracks" hours | 15 | ∞ |

Sample H shows a much better homogeneity under microscope than G, as see it has a considerably increased resistance to impact and cracks.

We claim:

1. A homogenous plastic composition formed of about 25 to 40% by weight of polymethylmethacrylate, 25 to 40% by weight of high density polyethylene and 50 to 20% by weight of a block copolymer of ethylene with an alkyl methacrylate, containing 10 to 30% by weight of alkyl methacrylate the alkyl of which has 1 to 6 carbon atoms.

2. A homogeneous plastic composition according to claim 1, wherein said alkyl is methyl.

3. A homogeneous plastic composition according to claim 1, wherein said alkyl is hexyl.

* * * * *